Figure 1:
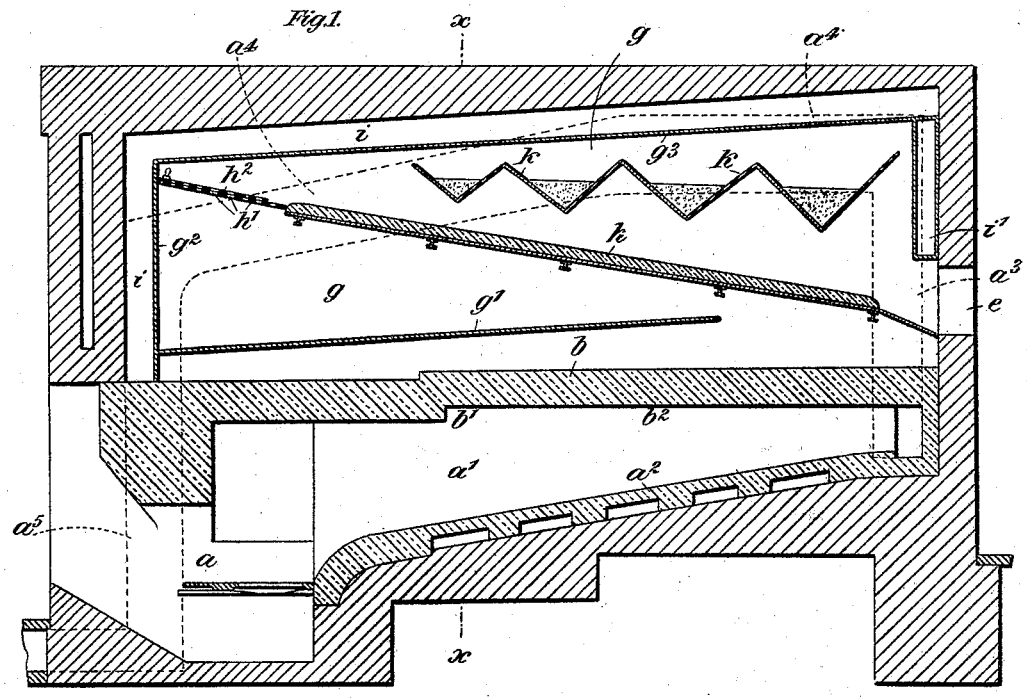

No. 611,394. Patented Sept. 27, 1898.
A. RAUBER.
BAKER'S OVEN.
(Application filed July 22, 1898.)
(No Model.) 2 Sheets—Sheet 1.

Witnesses:
E. B. Bolton
Thomas Howlett

Inventor:
Adolph Rauber
By his Attorneys

THE NORRIS PETERS CO., PHOTO-LITHO., WASHINGTON, D. C.

No. 611,394. Patented Sept. 27, 1898.
A. RAUBER.
BAKER'S OVEN.
(Application filed July 22, 1898.)
(No Model.) 2 Sheets—Sheet 2.

UNITED STATES PATENT OFFICE.

ADOLPH RAUBER, OF MUNICH, GERMANY.

BAKER'S OVEN.

SPECIFICATION forming part of Letters Patent No. 611,394, dated September 27, 1898.

Application filed July 22, 1898. Serial No. 686,583. (No model.)

*To all whom it may concern:*

Be it known that I, ADOLPH RAUBER, a subject of the King of Bavaria, residing at Munich, in the Kingdom of Bavaria, Germany, have made certain new and useful Improvements in Bakers' Ovens, of which the following is a specification.

My invention has for its object to equally distribute and maintain equal the baking heat over the whole baking-chamber, or rather the whole baking-surface, in baking-ovens which work continuously, and thereby to obtain an even simultaneous baking through of all the articles to be baked inserted in the oven.

In all baking-ovens hitherto employed the drawback exists that the temperature in the rear part of the baking-chamber opposite to the feed-opening is always higher than in the front part, the reason of which is that at each opening of the door at the feed-opening the front part of the baking-chamber undergoes a cooling, and also that in consequence of the arrangement of the furnace at the end of the oven opposite the feed-opening more heat is produced at that end than in front, and finally in the case of ovens in which there is a fixed wall rising from the front to the rear obliquely there is always an accumulation of heat in the rear part of the baking-chamber in consequence of the tendency of the warm air to move upward. The result of this is that there is always a more rapid and stronger baking of the bread in the rear part of the oven than in the front part, so that the baking has to be constantly watched and the material to be baked constantly changed at short intervals, while even with the greatest care it is impossible to always obtain a thoroughly and evenly baked article. This drawback is removed by means of the present invention, and the result is obtained that all the material placed in the oven to be baked is always baked through simultaneously and evenly, so that after the expiration of each baking period the whole layer of the material to be baked may be taken out at one time and be replaced by a fresh one, and thus the working is considerably simplified and facilitated and all the baked goods may be obtained of even quality.

The invention consists, mainly, in the baking-box, which contains the baking-plate, being arranged in the baking-chamber to rise obliquely from the back to the front, so that the heat in its tendency to rise upward is always compressed toward the front, and also by the baking-box being surrounded by air-chambers rising to the front, and, further, by flues, also rising to the front, so that the distribution of the heat to the front is assisted. Some further points of the invention assisting the same object will be mentioned later in the specification.

Figure 2:
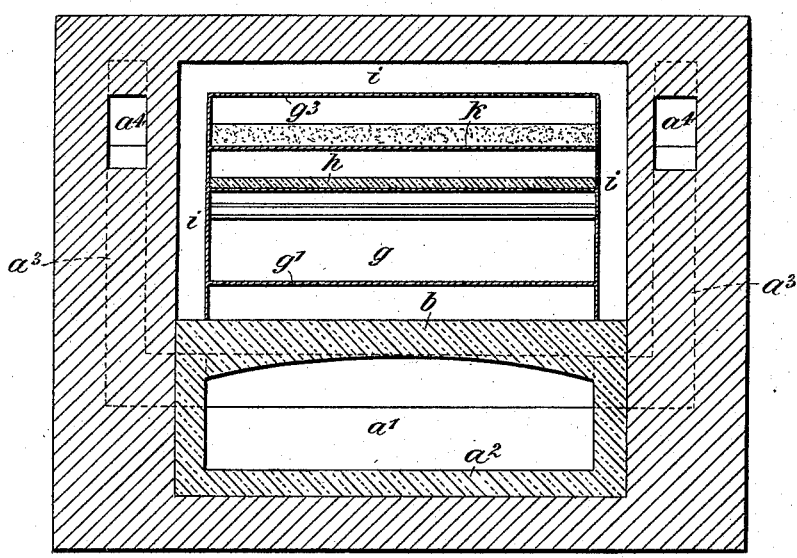

In the accompanying drawings, which form a part of this specification, Figure 1 shows a longitudinal section of a baking-oven arranged according to this invention which is provided with a fixed baking-plate rising obliquely from the front to the rear; Fig. 2, a cross-section on the line $x$ $x$ of Fig. 1, and Fig. 3 a longitudinal section of a modification of the furnace in which the baking plate or hearth is arranged horizontally and made capable of being withdrawn.

$a$, Fig. 1, is the furnace, arranged at the rear side of the oven.

$a'$ is a furnace-flue or fire-passage with an obliquely-rising sole $a^2$ and extending along to the front under the floor $b$ of the baking-chamber, which causes the hot gases to be conveyed to the front end of the oven, as closely as possible under the baking-chamber, in order to heat the latter intensely, more particularly at the front end. The floor $b$ of the baking-chamber is raised or stepped upward from the point $b'$, so that under its front part a recess or inset $b^2$ is formed in which the hot gases accumulate and are retained, thus utilizing as far as possible their heat for warming the floor part of the baking-chamber. In the baking-chamber above the floor $b$ (which is heated by the chamber-floor $b'$, which is in turn heated by the furnace-gases) an iron casing or box $g$ is arranged. This contains the baking floor or plate $h$, rising obliquely to the rear from the feed-opening $e$, formed in the front wall of the oven, and which baking-plate is formed of an iron plate covered with a fire-clay covering. The bottom $g'$ of the box $g$ is arranged at some distance from the floor of the chamber $l$ and rises obliquely to the front from the rear wall $g^2$ of the box $g$ and ends at some distance from the plate $h$. The cover or lid $g^3$ of the box $g$ is also arranged so as to rise obliquely from the rear to the front. In consequence of this arrangement the heat flows over and against the chamber-floor $b$, as it has a tendency to pass upward and along the obliquely-rising floor $g'$ of the box, first to the front under front part of the plate $h$, so that, above all things, this latter is intensely heated in its front part. From here the heat rises and runs to the rear under the baking-plate, thus warming the same along its whole extent. The heat accumulating under the rear upper end of the baking-plate is conducted through openings or slots $h'$, provided in the part of the iron baking-plate which is not coated with fire-clay, and into the chamber of the box $g$, situated over the baking-plate, and passes to the front under the cover $g^3$, which rises to the front, thus producing in this manner the necessary oven heat, which again is the strongest in the front parts of the baking-chamber, where the hot air accumulates finally, as is required. The openings $h'$ may be closed or made adjustable by means of a slide $h^2$, provided with corresponding openings, in order to allow the passage of heat from the under to the upper space to be regulated. The openings $h'$ may, however, be entirely omitted and the rear upper part of the iron baking-plate be closed. Said plate can then transfer the heat accumulating underneath to the chamber above the plate by radiation, or this rear prolongation of the iron baking-plate may be entirely dispensed with, and the under space of the baking-box may be here freely in communication with the upper space—as may be seen, for instance, in Fig. 3.

The baking-box $g$ is inclosed behind, at the sides, and above by a space $i$, which also rises from the rear to the front and conveys heat from the rear part of the oven to the front and accumulates same at the front end over the box, thus assisting the tendency to force the heat toward the front end from the rear part of the oven, where if left to itself it would mainly accumulate. A space or chamber $i'$ is formed in the front wall of the box $g$, and said chamber has for its object to retain as much heat as possible at the front end of the box over the feed-opening, and thereby to counteract the cooling which takes place when the feed-door is opened.

The furnace-passage $a'$ divides at its end into two vertical flues $a^3$, Figs. 1 and 2 in dotted lines, which extend at both sides of the baking-chamber up to the upper part of the same. From here the furnace-gases pass through passages $a^4$, which slope from front to rear obliquely and cause the gases to pass to the rear end of the oven, where they come into the chimney through passages $a^5$, leading vertically downward. The inclined position of the passages $a^4$ has for its effect to cause the fire-gases to accumulate, not as hitherto in the rear, but in the highest front part of the same and to thereby come more into action on the front than on the rear part of the oven, by which means the desired action—namely, compression of the heat from the rear to the front—undergoes a further considerable assistance.

In order to bring the top heat to the upper part of the baking-plate in close proximity and to maintain it over the same, a zigzag-shaped intermediate cover $k$ may, as shown in Fig. 1, be preferably arranged over the baking-plate $h$ in the chamber of the baking-box $g$. The heat rising from the baking-plate remains stored in the separate under projections or folds of this zigzag roof and can therefore neither rise too far away from the plate nor escape laterally, but is permanently retained close to the plate, and therefore maintains the baking temperature over the plate constantly at the necessary degree. This intermediate cover thus engages the heat pressing from the rear to the front in the baking-box and radiates it downward against the baking-plate, so that the top heat comes more permanently into play on the front part of the baking-plate. This action is further facilitated if, as shown, the separate compartments or corrugations of the intermediate cover $k$ be filled more or less with sand, in which the heat will be accumulated. This intermediate cover narrowing the upper chamber of the baking-box has also the further advantage coupled with it that less steam is necessary for moistening the baking goods.

Figure 3:
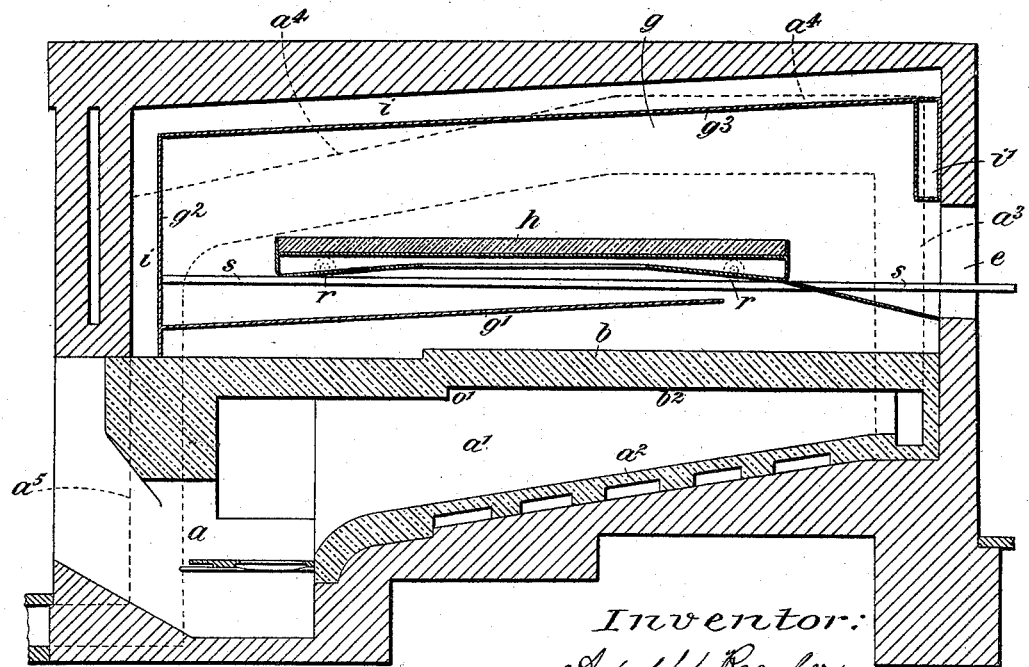

The arrangement shown in Fig. 3 corresponds fully to that shown in Fig. 1, only in this case the baking-plate $h$ is horizontal and arranged so as to travel by rollers $r$ on rails $s$, so that it may be withdrawn from the baking-chamber each time it requires replenishing.

Having now described my invention, what I claim as new, and desire to secure by Letters Patent, is—

1. A baking-oven comprising a baking-box $g$, and a baking-plate $h$ being arranged in an inclined position rising from the rear to the front in the baking-chamber, with the object of avoiding an accumulation of heat in the rear part of the oven so that the heat shall be constantly conveyed toward the front and thereby an even baking temperature in all parts of the oven be obtained, substantially as described.

2. A baking-oven comprising a baking-box $g$ rising in height toward the front and being surrounded by an air-space $i$ which, corresponding to the position of the baking-box, rises toward the front and conveys heat from the rear part of the oven to the front part over the baking-box with the object of assisting the distribution of the heat toward the front, substantially as described.

3. In a baking-oven a baking-plate $h$ being provided at its upper end with perforations $h'$, capable of being closed if desired, with the object of effecting a direct delivery of heat from the air beneath the baking-plate to that directly above it and thereby to facilitate the transference of heat to the front over the baking-plate, substantially as described.

4. In a baking-oven a zigzag-shaped intermediate cover $k$ being arranged over the baking-plate $h$ in the baking-box, with the object of retaining the heat in the front part of the baking-box in greater proximity to the baking-plate, substantially as described.

5. In a baking-oven two inclined flues $a^4$ rising obliquely toward the front from the rear part of the oven with the object of accumulating the fire-gases toward the front part of the oven and thereby of supporting the heat-distributing action toward the front, substantially as described.

6. In a baking-oven, a furnace or flue-passage having a horizontal top wall and an oblique sole inclining upwardly toward the front, said top wall being arranged with its forward portion at a higher elevation than the rear portion whereby a recess is provided in said forward portion, serving to retain the gases closely under the front end of the baking-chamber, substantially as described.

In witness whereof I have hereunto set my hand in presence of two witnesses.

ADOLPH RAUBER.

Witnesses:
HARRY BELMONT,
HEINRICH WAGNER.